United States Patent [19]

Jurek

[11] 4,289,951
[45] Sep. 15, 1981

[54] POWER FACTOR MONITORING AND CONTROL SYSTEM FOR RESISTANCE WELDING WITH LINE DISTURBANCE IMMUNITY

[75] Inventor: Dennis J. Jurek, Grafton, Wis.
[73] Assignee: Square D Company, Palatine, Ill.
[21] Appl. No.: 12,926
[22] Filed: Feb. 16, 1979
[51] Int. Cl.³ ............................................. B23K 11/24
[52] U.S. Cl. ................................... 219/110; 219/114; 219/117.1; 323/211
[58] Field of Search ............... 219/108, 109, 110, 114, 219/117.1; 323/102, 105, 119

[56] References Cited

U.S. PATENT DOCUMENTS

| | | | |
|---|---|---|---|
| 3,010,064 | 11/1961 | Ross | 323/105 |
| 3,694,615 | 9/1972 | Brandeis | 219/110 |
| 3,832,518 | 8/1974 | O'Neal, Jr. | 219/110 |
| 4,104,724 | 8/1978 | Dix et al. | 219/108 |

Primary Examiner—C. C. Shaw
Attorney, Agent, or Firm—Michael J. Femal

[57] ABSTRACT

A power factor monitoring and control system with line disturbance immunity for controlling the quality of spot welds made by resistance welding techniques such as those used in the automotive industry on assembly line welders. As is commonly known, quality and strength of a spot weld can be correlated to a change in resistance measured through the weld as the weld progresses during the fusion progress. This change in resistance in the secondary circuit reflects back through the transformer to its primary circuit as a change in power factor. The timing changes resulting from the change in power factor are sensed by the control circuitry of this system to generate signals which are used by an 8-bit microprocessor properly programmed to operate on the signal information. By determining the amount of increase or decrease that has occurred in the current conduction angle during a group of welds, a basis for the control of the welding heat is obtained. By averaging the results of these measurements over a sufficiently large number of welds, the effect of random line disturbances is cancelled out.

10 Claims, 6 Drawing Figures

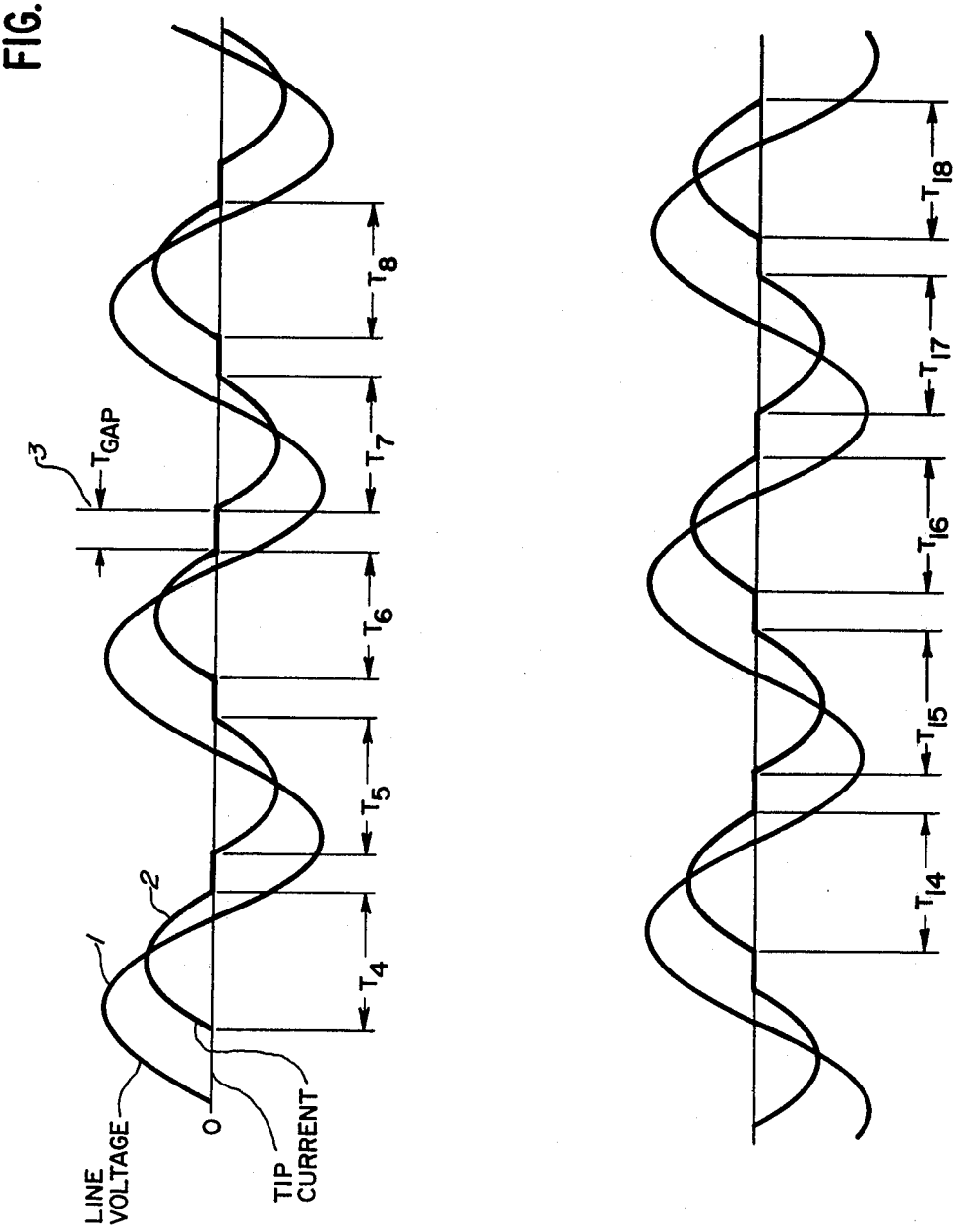

POWER FACTOR MONITORING AND CONTROL SYSTEM FOR RESISTANCE WELDING WITH LINE DISTURBANCE IMMUNITY

BACKGROUND OF THE INVENTION

This invention relates to a power factor monitoring and control system for resistance welding with line disturbance immunity, and more particularly, to a control which senses the resistive changes that occur in the formation of a quality weld in the secondary of a welding transformer by monitoring the corresponding change in the total load power factor as sensed in the primary of a welding transformer to provide an automatic heat control for improving weld quality over the tip life as well as reducing power consumption.

Resistance welding is now widely used in most applications involving the joining of metal, such as mild steels used in the manufacture of automobiles, and is recognized by all users as a most economic and rapid process when properly applied. Nevertheless, there are a number of parameters in the weld process that must be monitored in order to provide a quality weld. One such parameter that must be carefully monitored is the wear (mushrooming) of the welding electrodes (tips) which must be compensated for by increasing the weld heat in order to insure a good quality weld throughout the tip life.

Typically, prior art attempts at insuring weld quality despite tip wear included the following monitoring (feedback) control techniques:

1. Optical (infra-red), i.e., monitoring surface radiation to assess weld quality;
2. Weld expansion, i.e., monitoring electrode displacement (thermal-expansion);
3. Ultra-sonic, i.e., monitoring ultra-sonic transmissions transmitted through the weld area during the weld formation process;
4. Weld energy, i.e., monitoring weld energy during the formation of the weld;
5. Acoustic emmissions (expulsion detector), i.e., monitoring the acoustic emmisions during weld formation; and
6. Resistance change, i.e., monitoring the resistance change occurring during the weld formation.

Specifically, all of the above prior art techniques of monitoring weld quality were implemented by attaching or positioning various sensors and their respective leads in direct contact with the welding electrodes or in close proximity thereto. Unfortunately, these monitoring devices and their leads attach to, or in close proximity to, the welding electrodes, that work so well in a laboratory environment when manned by expert technicians, seldom stood up in an industrial environment in which welding machines are sometimes manned by unskilled operators on an assembly line. The results, in many cases, were damaged monitoring devices as well as severed leads thereto which made it impossible to monitor the quality of the weld.

For the above stated reasons, monitoring devices and their leads attached to or in close proximity to the welding electrodes are often inadequate to assure good quality welds throughout the tip life because of the continual maintenance problems. Examples of the above type of monitoring techniques and associated devices are contained in a publication entitled "Resistance Welding Control Monitoring" published by the Welding Institute located at Abington Hall, Abington, Cambridge, C.B. 16A1, United Kingdom, copyrighted 1977.

One successful way to compensate for electrode wear without attaching monitoring devices next to or on the welding tips is found in the Digital Welder Control System of U.S. Pat. No. 4,104,724 ('724 Patent). The controller of this patent provided a maintenance interval counter and compensator control having a 4-step, stepper. The stepper control of this patent is used to automatically increase the weld heat after a preset number of welds based on past experience to compensate for electrode mushrooming. Moreover, the digital welding control system of this patent is hereby incorporated by reference as to a type of digital welder control system that is ideally suited for modification to incorporate the features of the present invention.

The invention disclosed here represents an improvement over that disclosed in the patent application Ser. No. 006,990 entitled "Power Factor Monitoring and Control System for Resistive Welding" filed Jan. 29, 1979. It has been found that in situations where several welders are operating simultaneously on the same power bus line, the line voltage waveform becomes distorted so that the line voltage zero crossing can no longer be used as an accurate timing reference point. Additionally, the distortion of the voltage waveform has an effect on the current extinction angle. Both of these problems can, in some circumstances, exceed the magnitude of the signal caused by the changes in resistance of the work pieces as the weld is being performed.

One feature of the present invention avoids the use of the line voltage zero crossing as a timing reference point, and substitutes, therefore, the total conduction time of the current as the measurement interval. Since the line voltage waveform distortion tends to be random in nature, the effect of this distortion can be reduced by averaging the results of the measurements over a preselected number of welds. Although this technique is incompatible with a mode of operation whereby the current is terminated as each weld is found to be complete, it does provide a basis for developing a feedback signal which can be used to control the weld current or time over a group of welds. Thus, the welder control system of the present invention adjusts itself for changes due to tip wear, line voltage, initial setpoint errors, etc. These adjustments are necessarily gradual in nature because of averaging process.

SUMMARY OF THE INVENTION

With this invention, the foregoing problems of attaching or positioning various sensors and their respective leads in direct contact with the welding electrodes or in close proximity thereto, and of distortions in the line voltage waveform are substantially solved. The power factor monitoring and control system for resistance welding with line disturbance immunity utilizes similar circuits and control modules as shown in the '724 Patent. Again, an 8-bit microprocessor identical to one described in the '724 Patent functions as the main control element. The microprocessor's known cycle time to execute an instruction is used to measure a real time period representing the time between the initiation of current and the end of current conduction. An automatic power factor circuit (hereinafter called APF) senses the current through the silicon controlled rectifier (hereinafter called SCR) welding contactors which control the current to the primary of the welding transformer. When the APF circuit senses the end of current conduction of each half cycle, it generates an extinction signal. It is commonly known that in the process of performing a resistance weld on a given material, the ohmic resistance of the work piece as a function of time or cycles follows a characteristic path. In the present invention, a numerical representation of the resistance path or curve is developed in the microprocessor so that when the curve is examined for certain characteristics, determination can be made of the sufficiency of energy being supplied to the welds to assure weld quality. Fortunately, any resistive changes in the secondary circuits of the welding transformer are reflected back to the primary of the welding transformer as a change in the total load power factor as evidenced by change in the current conduction angle of each weld half cycle. The microprocessor measures the current conduction time from the point of initiation (issuance of SCR gate signal) to the point of extinction (receipt of APF extinction signal). By operating on the current conduction times for each half cycle, the microprocessor is able to recreate a numerical representation of the dynamic resistance curve. By taking information derived from the numerical representation of the resistance of each weld and summing this information over a preselected number of welds and then divide by the preselected number of welds, an average measure of this sufficiency of heat applied to that number of welds is obtained. Based on this measurement, the heat of the weld is increased as the tips deteriorate and mushroom by varying the current in the representative heat equation of $H = I^2 RT$ as is well known in the art. In other words, the current is increased as the tips deteriorate and mushroom.

Accordingly, the principle object of the present invention is to provide a power factor monitoring and control system for resistance welding with line disturbance immunity in which the quality of the weld is determined by measuring the resistive change associated with weld quality in the secondary of the welding transformer by sensing the power factor change in the primary circuit of the welding transformer thereby eliminating the necessity of attaching monitoring devices in their respective leads in close proximity to the welding electrodes.

Another object is to provide a power factor monitoring and control system for resistance welding with line disturbance immunity in which deterioration of the welding electrodes is automatically compensated for by increasing or decreasing the current until the resistive change associated with a quality weld occurs.

A further object is to provide a power factor monitoring and control system for resistance welding with line disturbance immunity which reduces the complexity of the devices in associated circuitry required to determine a quality weld, and which eliminates the necessity of connecting any external monitoring circuitry in a secondary circuit of the welding transformer.

Still another object is to provide a power factor monitoring and control system for resistance welding with line disturbance immunity in which the measured results of the sufficiency of heat are averaged together for a preselected number of welds to provide a control signal for increasing or decreasing the weld current associated with a quality weld in which the control signal is minimally affected by line disturbances.

Other objects and advantages will become apparent from the description wherein reference is made to the accompanying drawings illustrated the preferred embodiments of the invention.

BRIEF DESCRIPTION OF THE DRAWINGS

FIG. 3. shows a current and voltage versus time diagram of the early half cycles in a weld and the last half cycles in a weld which serve to explain the controller of FIG. 1;

DESCRIPTION OF PREFERRED EMBODIMENT

Figure 1:
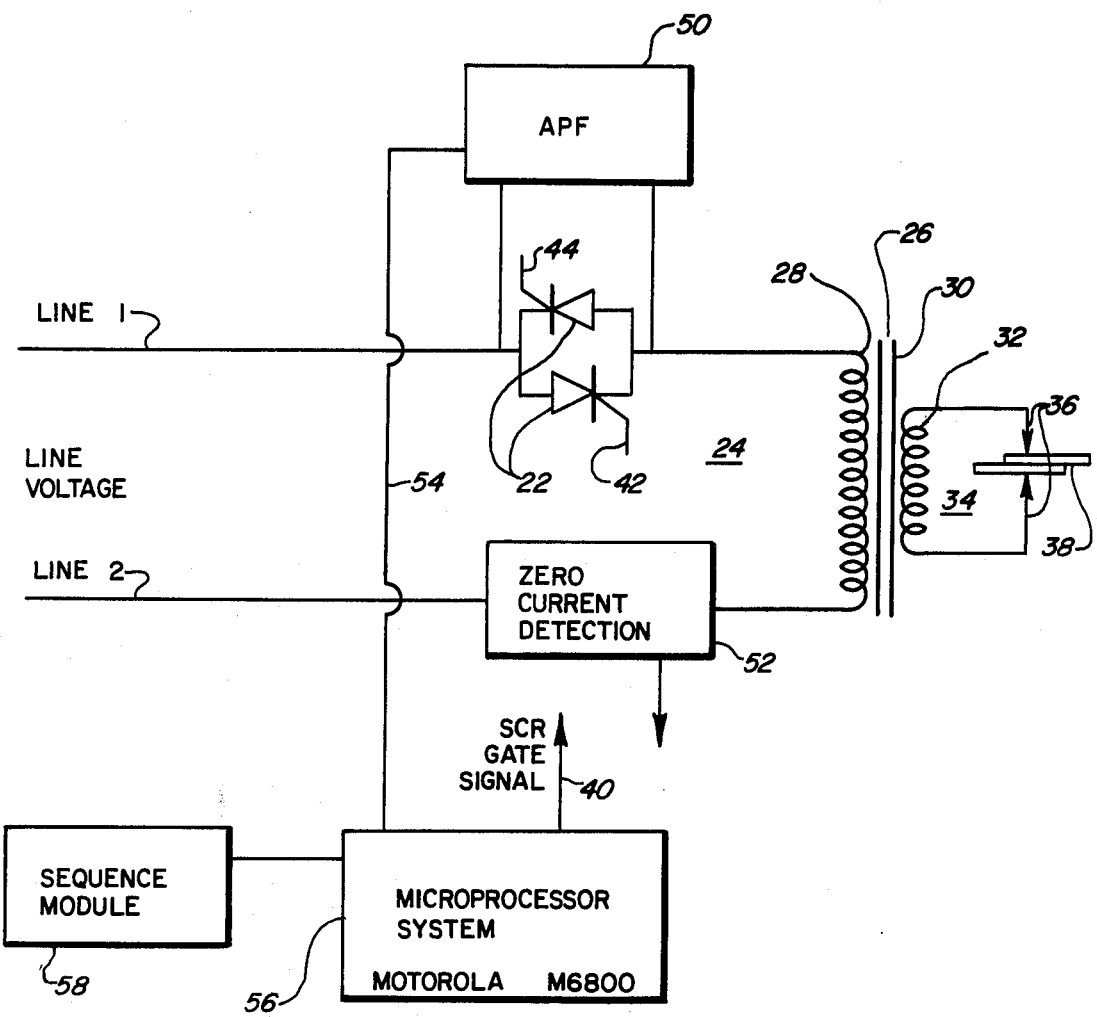
FIG. 1 shows a partial block and schematic representation of a power factor monitoring and control system for resistance welding with line disturbance immunity embodying the principles of the present invention.

Referring to FIG. 1, a pair of inversely connected SCR welding contactors 22 are used to control the current delivered to primary circuit 24 of a welding transformer 26 including a primary winding 28, an iron core 30, a secondary winding 32, and a secondary circuit 34. The secondary circuit 34 further includes a pair of welding electrodes 36 with work pieces 38 clamped therebetween for a typical spot weld of the type used in the automotive industry.

The primary winding 28 of the welding transformer 26 is connected across lines 1 and 2, respectively, which in turn are connected to a line voltage source of any known value for resistance welding. The control system could be connected to either a single phase voltage source as shown or a polyphase voltage source utilizing any known converter in the art. In the case of a polyphase system, duplicate detection circuitry would be associated with each phase. Initiation of current conduction through the SCR welding contactors 22 is controlled by an SCR gate signal 40 which is fed to gates 42 and 44 across SCR welding contactors 22. The state of conduction of the SCR welding contactors 22 is determined by an automatic power factor (APF) circuit 50 described in the '724 patent or in the alternative by a series zero current detector 52 which is well known in the art. The APF circuit 50 senses the voltage across SCR welding contactors 22 and produces a logic zero output on a line 54 when voltage is present across the SCR welding contactors 22 (this corresponds to the non-conduction state of the contactors 22). If a nominal voltage is present across the SCR welding contactors 22, the welding contactors 22 are conducting and the APF circuit 50 generates a logic 1 put on line 54. The output signal on line 54 is fed to a microprocessor system 56 which is an 8-bit microprocessor of any known type such as a Motorola M6800 as its main control element. The SCR gate signal 40 represents the initiation of current conduction and in conjunction with a conduction signal produced by the APF circuit 50 on line 54 are used to define time periods related to the change of resistance that occurs during the weld.

The microprocessor system 56 consisting of the 8-bit Motorola M6800 microprocessor and associated memory and various ancillary devices generates the SCR gate signal 40 as well as receives the state of conduction of the SCR welding contactors 22 on line 54. The microprocessor system 56 generates appropriately timed SCR welding contactor gate signals on line 40 and feeds these gate signals to gates 42 and 44 of SCR welding contactors 22 based on operator input data entered via a sequence module 58 such as the desired welding current, the duration of the weld, etc., as fully described in the '724 patent based on its analysis of the relative timing between initiation and extinction of the current conduction through the SCR welding contactors 22.

Figure 4A:
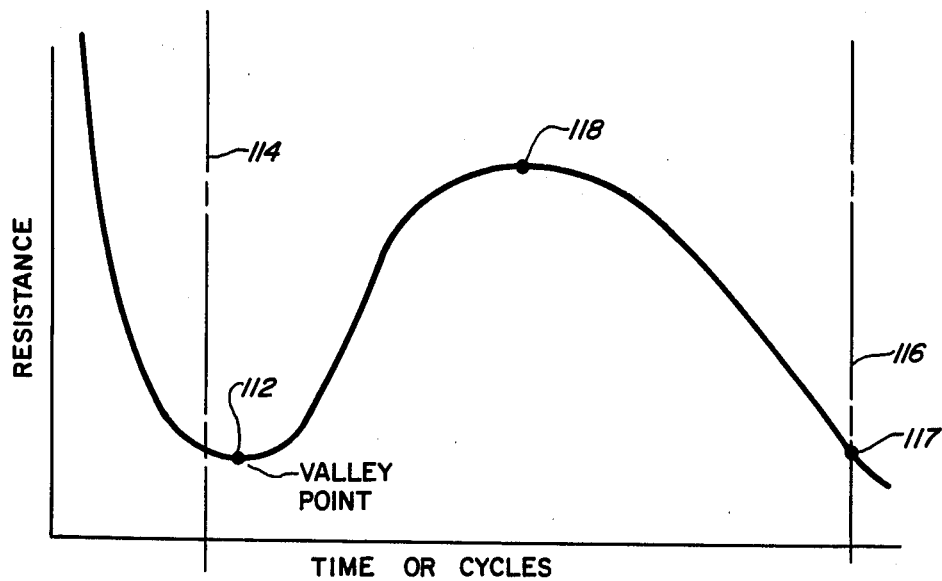
FIG. 4A shows the characteristic dynamic resistance curve of mild steels in resistance welding occurring during the half cycles of a weld as shown in FIG. 3.
Figure 4B:
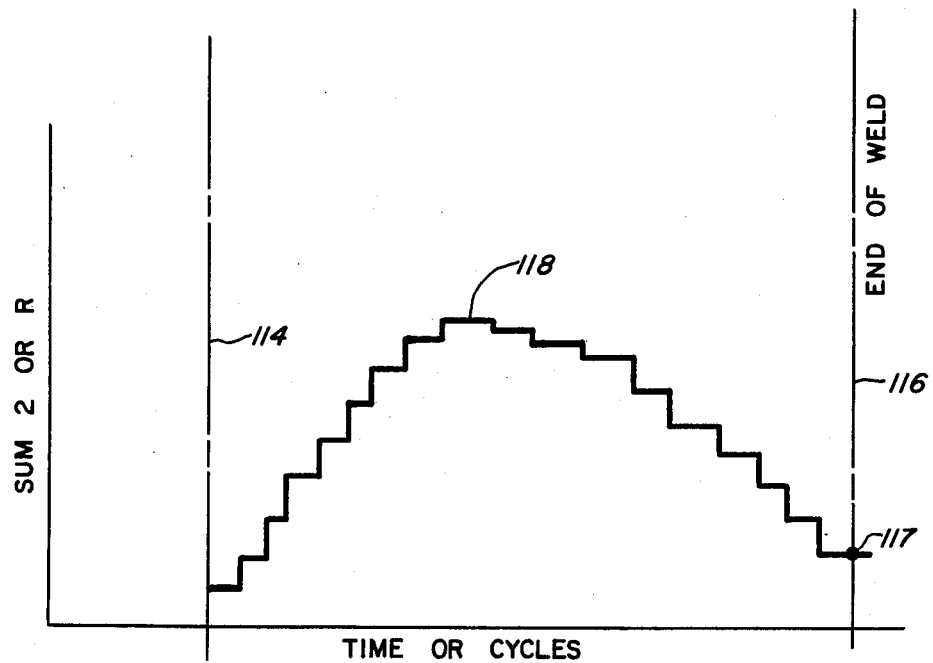
FIG. 4B illustrates the numerical representation of the curve in FIG. 4A by the controller of FIG. 1.

It is commonly known that in the process of performing a resistance weld, the ohmic resistance of the work piece as a function of time or cycles follows a characteristic path. This path or curve is illustrated in FIG. 4A in the case of mild steel. The apparatus of the current invention develops a numerical representation of the resistance curve within the microprocessor so that when the curve is examined for certain characteristics, determination can be made of the sufficiency of energy being supplied to the weld. FIG. 4B illustrates the numerical representation of the resistance curve as shown in FIG. 4A.

Referring to FIG. 3, a sinewave line voltage 1 and an intermittent current waveform 2 through SCR welding contactors 22 are shown. For this explanation of this invention and in actual operation, a gap time 3, labled Tgap in FIG. 3, is held constant throughout each weld pulse. The gap time can be adjusted between weld pulses to change the effective current.

Under steady state conditions, if there were no changes in the work piece resistance, conduction time periods T4, T5, T6 etc. will be equal to the time period of one voltage half cycle less the gap time, Tgap. If a positive step change in resistance occurs during the gap interval between T5 and T6, the current of half cycle 6 will extinguish earlier than normal, thus, T6 will become smaller than the preceding conduction angles. Because the gap time is held constant, the initiation point of half cycle 7 will occur earlier than normal which tends to make the conduction time T7 longer, however, counteracting this is the fact that the circuit resistance is still larger than its initial value by the positive step of resistance change which occurred earlier. The result of these two counteracting tendencies is to cause T7 to be approximately equal to the undisturbed conduction periods T4 and T5. Proceeding to T8, it will be initiated at a approximately the proper time and, thus, also take on the steady state value. Until the resistance again changes, it can be seen that the conduction times settle down to the normal time period of one half cycle of line voltage less the gap time, Tgap. Based on this explanation, it can be seen that the conduction times respond in a manner that is approximately proportional to the negative of the time derivative of the circuit resistance.

Figure 2:
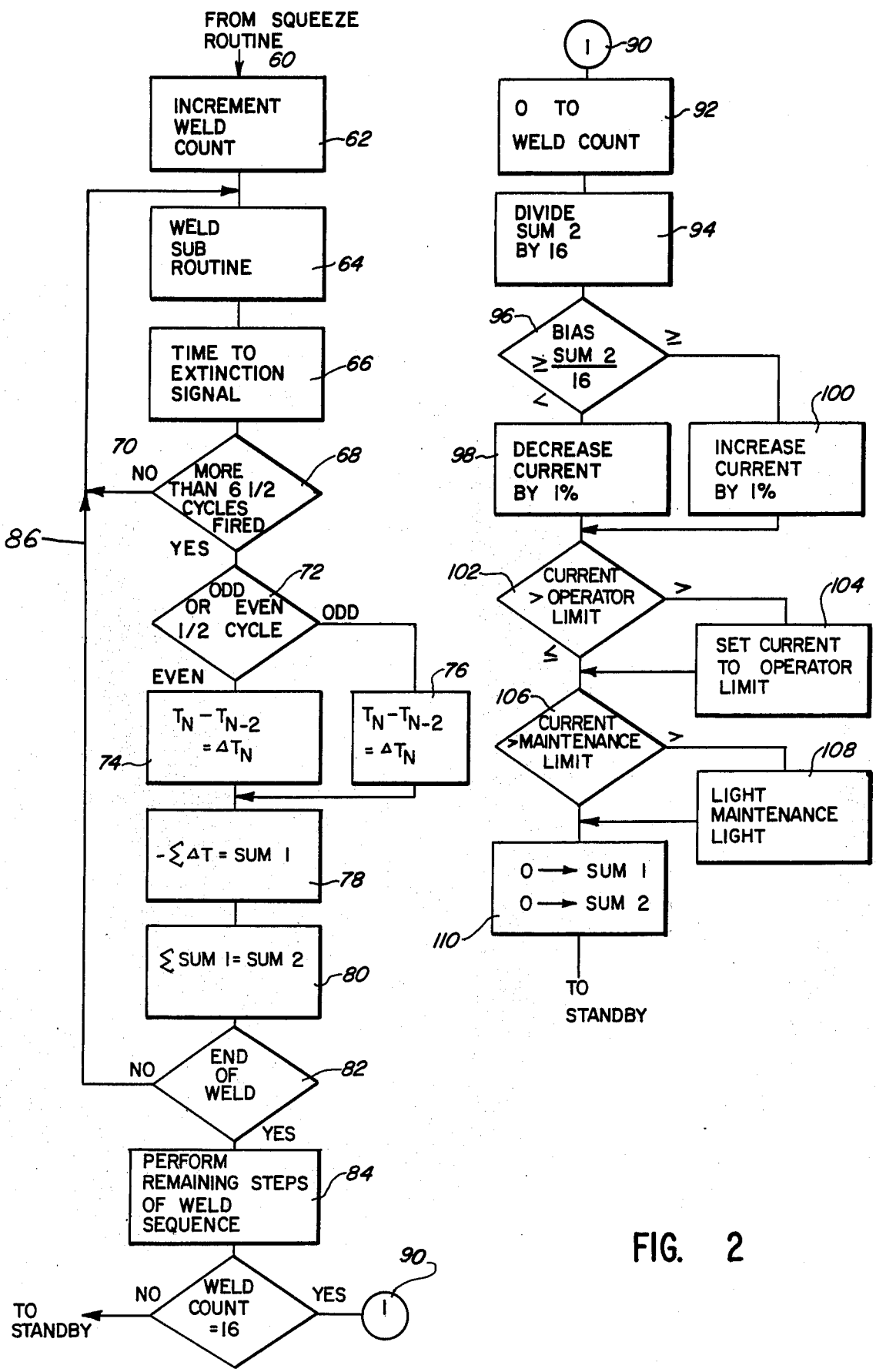
FIG. 2 is a block diagram flow chart utilized by a microprocessor of FIG. 1.

The measurement of the conduction times for each half cycle and the analysis thereof occurs in the system's software. Referring to the partial system's flow chart as shown in FIG. 2, upon completion of the squeeze period, the microprocessor leaves the squeeze routine via line 60 and enters a increment weld count block 62. The increment weld count block 62 increments a counter each time a weld is performed. From block 62, the microprocessor enters a weld subroutine block 64 where checks and timing are performed to gate the SCR welding contactors 22 at the appropriate time. Upon issuing a gate pulse and performing some subsequent related functions, the microprocessor measures the time elapsed until the end of conduction. Note that the time measured is not the full conduction time, but is less by the fixed amount of time consumed in the weld routine subsequent to issuing the gating pulses. Because of this fixed time delay and because of unknown time errors associated with the gating circuit, SCR welding contactors 22 and the APF circuit 50, it is better to use the differences in the conduction times rather than the actual values of the conduction times. Additionally, small timing errors occur which are dependent on the polarity of the line voltage, these include rectification at the tips due to oxides and other impurities, unequal response times of the two SCR welding contactors 22, etc. These timing errors can be eliminated by forming the differences in conducting periods, Delta T's on an odd and even basis. Thus, for example, Delta T7 is equal to T7−T5, note that T7 is odd and T5 is associated with the previous odd half cycle of conduction; similarly, Delta T8 is equal to T8 minus T6. This process of differencing the conduction times has the approximate effect of taking the time derivative of the conduction time function. Thus, at this point, the microprocessor has available to it an approximation of the second derivative of the resistance time function. To convert this back to a representation of the resistance function, it is necessary to perform a double integration. Referring back to weld subroutine 64, the microprocessor next proceeds onto a time to extinction signal block 66. On entering block 66, the microprocessor's system 56 enters a 5 microsecond timing loop representing the known cycle time of the microprocessor to repeatedly execute two instructions, one of which adds a one count to an accummulator therein every 5 microseconds until the APF signals is generated on line 54 from the APF circuit 50 indicating when current extinction occurs. The microprocessor then moves from block 66 to a more than 6 half cycles decision block 68. The function of this block is to eliminate any further analysis of the conduction time periods measured in the first six half cycles of the weld. If less than 6 half cycles have occurred, then the microprocessor exits this decision block 68 via no line 70 back to weld subroutine block 64. Block 68 is necessary because it has been found that the resistance varies in the early part of a weld somewhat indeterminately and, thus, does not produce usable data. Next, a decision block 72 determines whether time intervals are associated with odd or even half cycles of conduction. If the time interval is associated with an even half cycle of conduction, the microprocessor proceeds on to an arithmetic block 74 where Delta T is formed by subtracting the time of the previous even half cycle from the time of conduction of the current half cycle. If the time interval is associated with an odd half cycle of conduction, the microprocessor goes to an arithmetic block 76 in which a similar process is carried out as described for block 74 using the previous odd half cycle conduction time.

To integrate numerically as previously mentioned, it is necessary to sum the Delta T's as they are obtained. Block 78 forms the negative of this first integration. A block 80 repeats this process without negation to form the second numerical integral. The negation in block 78 is done so that a positive change in resistance results in a positive change in the numerical representation of the resistance, sum 2, as shown in FIG. 4B.

Proceeding to a decision block 82, if the total number of cycles programmed for the weld have been fired, the microprocessor moves onto a perform remaining steps of weld sequence block 84 which performs the remaining steps in the weld sequence. If not, control goes back to the weld subroutine block 64 via a line 86 to fire another half cycle and repeat the steps previously described above.

Upon completion of the weld and all the remaining steps in the weld sequence, the weld count which has been incremented at the start of the weld in block 62 is compared in a decision block 88 to a preselected number representing the total number of welds to be averaged together, in this explanation, arbitrarily chosen to be 16. When the weld count reaches 16, the microprocessor clears the weld count to zero, and divides sum 2 of block 80 by the number 16 to obtain the average value of the final resistance of the weld. Because sum 1 of block 78 and sum 2 of block 80 are zero prior to the start of the first weld in any group of 16 welds (see block 110, FIG. 2), sum 2 of block 80 divided by 16 corresponds to the difference in the average resistance from that at the end of the weld to that at the end of a blanking period defined by decision block 68 represented by a line 114 in FIGS. 4A and 4B. For typical weld schedules with mild steel, this corresponds approximately to a valley point 112 of FIG. 4A. Thus, the final resistance with respect to the valley point 112 is obtained. The operator is able to set the desired final resistance value with respect to the valley point 112 by entering a number called bias which is used by a decision block 96 to judge the adequacy to the current being used.

If the final resistance with respect to the valley point resistance 112 is higher than a preselected bias, the current is too low. The microprocessor then leaves decision block 96 and enters an increase current by 1% block 100 to increment the current by 1%. If the final resistance is lower than the preselected bias, the current is too high. The microprocessor then leaves decision block 96 and enters a decrease current by 1% block 98 and it decrements the current by 1%. The operator uses his experience and judgement to determine the preselected bias setting which may vary with materials, surface coatings, etc.

While the final resistance with respect to the valley point 112 criteria is discussed here, other methods such as the amount dropped from a peak value 118 as shown in FIGS. 4A and 4B can also be used. This would correspond somewhat to the peak detection of the previously mentioned patent application. In the case of materials which produce different resistance versus time curves, other criteria would be used instead of valley point or peak detection methods.

After the current is adjusted, the decision block 102 determines if the current exceeds the maximum limit set by the operator. If the adjusted current exceeds the maximum it is set equal to the maximum by a set current to operator limit block 104. The current is then compared to a maintenance limit block 106 which is set by the operator to turn on a light represented by a block 108 which indicates to the operator that the tips have degraded to the point that they must be renewed. Finally, in a block 110, the first and second sums are cleared to zero to be ready for the next group of 16 welds. The microprocessor then returns to its standby mode to wait another initiation by the operator.

Figure 5:
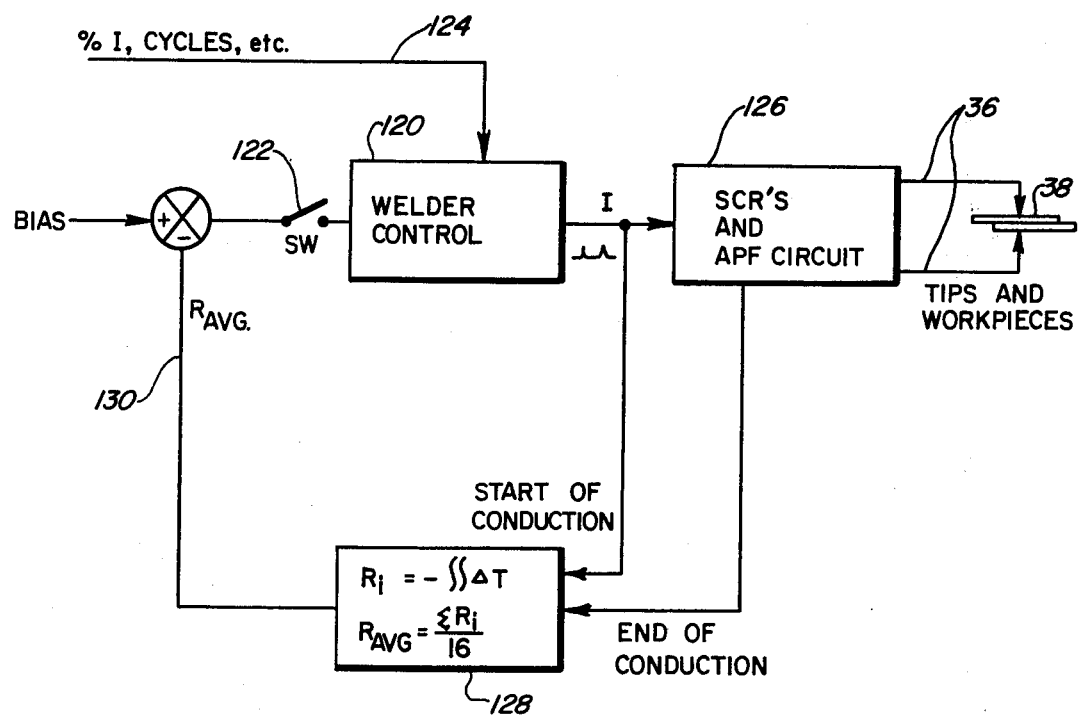
FIG. 5 illustrates a conceptualized block diagram of a controller in FIG. 1.

Turning now to FIG. 5, FIG. 5 is a conceptualized diagram of the automatic heat control system of the present invention. Block 120 represents the welder control as described in '724 patent with the additional feature that it can accept feedback information to adjust the weld current each time a switch 122 is closed. Block 120 also accepts normal operator inputs on a line 124 such as the initial percent current desired, number of cycles of weld, etc. as described in the '724 patent. The output of block 120 is the operating current I which consists of a train of appropriately timed gate pulses for a SCR and APF circuit block 126. Block 126 contains the SCR welding contactors 22 and the APF circuit 50 (as shown in FIG. 1) which is used to detect the extinction of current through the SCR welding contactors 22. Block 128 performs the signal analysis by timing the period from the issuance of a gate pulse to the extinction of conduction following that gate pulse and performing the differencing and double integration functions discussed previously to arrive at the average final value of resistance (R average 130) with respect to the valley point 112. Block 132 compares the R average 130 to the bias setting and forms an error signal which is gated to the weld controller 120 when switch 122 is closed every 16 welds. The embodiment of this invention is such that all blocks on FIG. 5 except block 126 and tips 36 and work pieces 38 are contained within the software of the microprocessor system 56 which rearranges the internal circuit operation of the welder control system.

I claim:

1. In a power factor monitoring and control system for controlling the quality of welds in resistance welding, a method comprising the steps of:
   analyzing differences in the current conduction times between half cycles in a weld due to the change in power factor;
   deriving a control signal from these differences on the basis of the average results over a least one weld; and
   using the control signal which is a measure of the sufficiency of energy applied to a weld to adjust the weld energy of succeeding welds.

2. In a power factor monitoring and control system for controlling the quality of welds in resistance welding with line disturbance immunity, a method comprising the steps of:
   analyzing the differences between current conduction times of half cycles in a weld due to the change in power factor during the weld;
   deriving a control signal from the analysis of these differences on the basis of the average results over a preselected number of welds; and
   using the control signal which is a measure of the sufficiency of energy applied to a weld to adjust the weld energy of suceeding welds.

3. A power factor monitoring and control system for controlling the quality of welds in resistance welding with line disturbance immunity, including welding transformer circuits, the improvement comprising:
   means responsive to the change in power factor of the welding transformer circuits during a weld for analyzing the differences in the current conduction times between half cycles in the weld;
   means for deriving a control signal from the analysis of these differences on the average results over at least one weld;
   and
   means for utilizing the control signal which is an average measure of the sufficiency of energy applied to a group of welds to adjust the weld energy of succeeding welds.

4. A power factor monitoring and control system for controlling the quality of welds in resistance welding with line disturbance immunity, including a welding transformer having primary and secondary circuits, a line voltage applied to the primary circuit and a load circuit in the secondary circuit, the improvement comprising:

means responsive to the initiation and termination of current conduction of each half cycle in a weld for measuring the differences between the current conduction times of these half cycles in the weld due to the change in power factor of the welding transformer circuits during the weld;

means for analyzing measured differences to approximate the time derivative of the conduction function which in turn is an approximation of the second derivative of the resistance function of the weld;

means for converting the conduction time function back to a numerical representation of the resistance function in the weld;

means for deriving from the numerical representation of the resistance function, a measure of the sufficiency of energy supplied to a weld;

means for summing and averaging the numerical results over a preselected number of welds to form a control signal; and means for applying the control signal resulting from the averaging of the preselected number of welds to adjust the amount of energy delivered to the weld for the next group of welds to be averaged.

5. The control system of claim 4 wherein said measuring means is connected to the primary circuit of the welding transformer.

6. The control system of claim 4 wherein the averaging means averages the results of a number of welds selected by the operator based on trial and test with a particular material to form the control signal.

7. The control system of claim 4 further including a pair of inversely connected SCR welding contactors connected in series with the primary circuit of the welding transformer to regulate the current delivered to the primary circuit after gating of the contactors when the control signal is applied thereto.

8. The control system of claim 4 further including means responsive to operator setting for biasing the weld to a preselected sufficiency of heat corresponding to the material to be welded and wherein the control signal changes the amount of energy delivered to the weld for the next group of welds to be averaged in a direction to approximate the preselected bias setting.

9. A power factor monitoring and control system for controlling the quality of welds in resistance welding with line disturbance immunity, including a welding transformer having primary and secondary circuits, a line voltage applied to the primary circuit and a load circuit in the secondary circuit, the improvement comprising:

means responsive to the initiation of current conduction of each half cycle in a weld as applied to the primary circuit for generating a first logic signal;

means responsive to the termination of current conduction of each half cycle in the weld for generating a second logic signal;

means responsive to the first and second logic signals for measuring the relative time interval between the first and second logic signals of each half cycle in the weld;

means for comparing the differences between conduction time intervals on an odd and even half cycle basis within the weld to approximate the time derivative of the conduction function which in turn is an approximation of the second derivative of the resistance function of the weld;

means for converting the conduction time function back to a numerical representation of the resistance function in weld;

means for deriving from the numerical representation of the resistance function, a measure of the sufficiency of energy supplied to a weld;

means for summing and averaging the numerical results over a preselected number of welds to form a control signal; and means for applying the control signal resulting from the averaging of the preselected number of welds to adjust the amount of energy delivered to the weld for the next group of welds to be averaged, wherein said averaging circuitry avoids random line disturbances without attaching monitoring devices and their respective leads in close proximity to the welding electrodes in resistance welding.

10. The control system of claim 9 further including means responsive to operator setting for biasing the weld to a preselected sufficiency of heat corresponding to the material to be welded and wherein the control signal changes the amount of energy delivered to the weld for the next group of welds to be averaged in a direction to approximate the preselected bias setting.

* * * * *